US012254851B2

(12) United States Patent
Feng et al.

(10) Patent No.: US 12,254,851 B2
(45) Date of Patent: Mar. 18, 2025

(54) BRIGHTNESS DETECTION METHOD FOR DISPLAY DEVICES, DISPLAY DEVICE AND READABLE MEDIUM

(71) Applicant: BOE TECHNOLOGY GROUP CO., LTD., Beijing (CN)

(72) Inventors: Yilin Feng, Beijing (CN); Zhaohui Meng, Beijing (CN); Yuxin Bi, Beijing (CN); Zhengri Lin, Beijing (CN); Yang Gao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/018,730

(22) PCT Filed: Jan. 29, 2022

(86) PCT No.: PCT/CN2022/075050

§ 371 (c)(1),
(2) Date: Jan. 30, 2023

(87) PCT Pub. No.: WO2023/142059

PCT Pub. Date: Aug. 3, 2023

(65) Prior Publication Data

US 2024/0127768 A1 Apr. 18, 2024

(51) Int. Cl.
*G09G 5/10* (2006.01)

(52) U.S. Cl.
CPC ....... *G09G 5/10* (2013.01); *G09G 2320/0673* (2013.01); *G09G 2320/0693* (2013.01); *G09G 2330/12* (2013.01); *G09G 2360/144* (2013.01)

(58) Field of Classification Search
CPC ............. G09G 5/10; G09G 2320/0673; G09G 2320/0693; G09G 2330/12; G09G 2360/144
See application file for complete search history.

(56) References Cited

U.S. PATENT DOCUMENTS

| | | | | |
|---|---|---|---|---|
| 9,754,543 | B2 | 9/2017 | Ma et al. | |
| 9,823,117 | B2 * | 11/2017 | Wieser | G01J 1/16 |
| 10,056,021 | B2 * | 8/2018 | Kim | G09G 3/20 |
| 10,217,439 | B2 * | 2/2019 | Bonnier | G09G 3/20 |
| 10,446,110 | B2 * | 10/2019 | Wang | G09G 3/3614 |
| 10,586,482 | B1 * | 3/2020 | Yung | G09G 3/2003 |
| 10,600,386 | B2 * | 3/2020 | Liu | G09G 3/3406 |
| 10,614,752 | B1 * | 4/2020 | Dodson | G02B 27/281 |

(Continued)

FOREIGN PATENT DOCUMENTS

| | | | |
|---|---|---|---|
| CN | 102322946 | A | 1/2012 |
| CN | 104361879 | A | 2/2015 |

(Continued)

*Primary Examiner* — Sejoon Ahn
(74) *Attorney, Agent, or Firm* — WHDA, LLP

(57) ABSTRACT

The application provides a brightness detection method, a computer device and a readable medium, where the brightness detection method includes: using each of display modules in a display module production line as a test module separately, where the test module is provided with a photosensitive sensor; obtaining a brightness algorithm formula of the photosensitive sensor of each of the test module; and performing, according to the brightness algorithm formula, ambient light detection by the photosensitive sensor.

10 Claims, 8 Drawing Sheets

(56) References Cited

U.S. PATENT DOCUMENTS

| | | | | |
|---|---|---|---|---|
| 11,191,144 | B2 * | 11/2021 | Gu | H04N 23/74 |
| 2006/0061563 | A1 * | 3/2006 | Fleck | G06F 1/3203 345/211 |
| 2006/0290616 | A1 * | 12/2006 | Murayama | H10K 59/13 345/76 |
| 2008/0129678 | A1 * | 6/2008 | Choi | H04M 1/22 345/102 |
| 2008/0165203 | A1 * | 7/2008 | Pantfoerder | G06F 3/0416 345/589 |
| 2011/0050416 | A1 * | 3/2011 | Lee | H01M 10/465 320/101 |
| 2015/0109455 | A1 * | 4/2015 | Pang | H04N 23/20 250/214 AL |
| 2016/0070337 | A1 * | 3/2016 | Cho | H04N 21/42202 345/156 |
| 2016/0071475 | A1 * | 3/2016 | Su | G09G 3/3696 345/89 |
| 2016/0078795 | A1 * | 3/2016 | Yeon | G09G 3/20 345/212 |
| 2016/0078798 | A1 * | 3/2016 | Watanabe | G09G 3/3413 345/88 |
| 2016/0078800 | A1 * | 3/2016 | Ha | G09G 3/32 315/209 R |
| 2016/0078804 | A1 * | 3/2016 | Cho | G09G 5/008 345/99 |
| 2016/0078824 | A1 * | 3/2016 | Meador | H05B 45/3725 345/212 |
| 2016/0307485 | A1 | 10/2016 | Ma et al. | |
| 2017/0171940 | A1 * | 6/2017 | Feng | H05B 45/10 |
| 2021/0240493 | A1 * | 8/2021 | Hamlin | G06F 9/4418 |
| 2021/0241719 | A1 * | 8/2021 | Choi | G09G 3/2003 |
| 2022/0208061 | A1 * | 6/2022 | Xiao | G09G 3/3611 |
| 2023/0267860 | A1 * | 8/2023 | Habel | G09G 5/02 345/590 |

FOREIGN PATENT DOCUMENTS

| | | | |
|---|---|---|---|
| CN | 108267223 | A | 7/2018 |
| CN | 211376153 | U | 8/2020 |
| CN | 112116888 | A | 12/2020 |
| CN | 113096614 | A | 7/2021 |
| EP | 2998952 | A2 | 3/2016 |

* cited by examiner (a) (b)

BRIGHTNESS DETECTION METHOD FOR DISPLAY DEVICES, DISPLAY DEVICE AND READABLE MEDIUM

CROSS-REFERENCE TO RELATED APPLICATION

This application is the U.S. national phase of PCT Application No. PCT/CN2022/075050 filed on Jan. 29, 2022, the disclosure of which is incorporated in its entirety by reference herein.

TECHNICAL FIELD

The present disclosure relates to the field of display technology, and in particular, to a brightness detection method, a brightness detection apparatus, a computer device, and a readable medium.

BACKGROUND

In related technologies, handheld devices such as tablet computers and mobile phones are equipped with a photosensitive sensor (sensor). The photosensitive sensor can automatically adjust the screen brightness of the handheld device according to the ambient light brightness of the handheld device, so as to save power consumption, and simultaneously, bring the best visual effect to the user. However, due to the semiconductor characteristics of the photosensitive sensor in the related art, there are problems of low accuracy, inter-chip difference and "zero point" drift.

SUMMARY

Embodiments of the present disclosure provide a brightness detection method, a computer device and a readable medium, which can greatly improve the brightness detection accuracy of the photosensitive sensor by improving the brightness algorithm of the photosensitive sensor.

The technical solutions provided by the embodiments of the present disclosure are as follows.

In one aspect, an embodiment of the present disclosure provides a brightness detection method, including:

- using each of display modules in a display module production line as a test module separately, where the test module is provided with a photosensitive sensor;
- obtaining a brightness algorithm formula of the photosensitive sensor of each of the test module; and
- performing, according to the brightness algorithm formula, ambient light detection by the photosensitive sensor.

Exemplarily, the obtaining the brightness algorithm formula of the photosensitive sensor of each of the test module specifically includes:

- performing sampling for a plurality of times within a standard illuminance value region to obtain a plurality of groups of sampling data, where each group of sampling data includes a standard illuminance value Y and a current parameter X fed back by the photosensitive sensor under the standard illuminance value Y;
- dividing, according to the size of the standard illuminance value Y, the plurality of groups of sampling data into sampling data in a low-brightness interval, sampling data in a middle-brightness interval and sampling data in a high-brightness interval;
- performing segmented curve fitting according to the sampling data in the low-brightness interval, the sampling data in the middle-brightness interval and the sampling data in the high-brightness interval, to obtain a first curve segment corresponding to the sampling data in the low-brightness interval, a second curve segment corresponding to the sampling data in the middle-brightness interval, and a third curve segment corresponding to the sampling data in the high-brightness interval;
- combining the first curve segment, the second curve segment and the third curve segment to obtain a brightness fitting curve; and
- outputting, according to the brightness fitting curve, a first version of brightness algorithm formula.

Exemplarily, the photosensitive sensor includes a shaded sensor that is shaded and a unshaded sensor that is not shaded, and the performing sampling for the plurality of times within the standard illuminance value interval to obtain the plurality of groups of sampling data, where each group of sampling data includes the standard illuminance value Y and the current parameter X fed back by the photosensitive sensor under the standard illuminance value Y, specifically includes:

- collecting a illuminance value Yj by an illuminance meter as the standard illuminance value Y during each sampling process, and collecting a unshaded current $L_j$ of the unshaded sensor and a shaded current $I_j$ of the shaded sensor in real time; and
- using a difference value between the unshaded current Lj and the shaded current $I_j$ as a current parameter X.

Exemplarily, the performing segmented curve fitting according to the sampling data in the low-brightness interval, the sampling data in the middle-brightness interval and the sampling data in the high-brightness interval, to obtain the first curve segment corresponding to the sampling data in the low-brightness interval, the second curve segment corresponding to the sampling data in the middle-brightness interval, and the third curve segment corresponding to the sampling data in the high-brightness interval specially includes:

- performing brightness curve fitting on each group of sampling data in the low-brightness interval to obtain a first curve segment;
- dividing the middle-brightness interval into subintervals, and performing brightness curve fitting on multiple groups of sampling data in the subintervals to obtain a second curve segment; and
- dividing the high-brightness interval into subintervals, and performing brightness curve fitting on multiple groups of sampling data in the subintervals to obtain a third curve segment.

Exemplarily, the dividing the middle-brightness interval into subintervals, and performing brightness curve fitting on multiple groups of sampling data in the subintervals specially includes:

- using a change value $$\frac{X_{j+1} - X_j}{Y_{J+1} - Y_J}$$

of current parameters X between adjacent groups of sampling data as an interval-division fitting standard value D; and
- dividing, according to the interval-division fitting standard value D, the multiple groups of sampling data into the subintervals with a set interval step value.

Exemplarily, the dividing, according to the interval-division fitting standard value D, the multiple groups of sampling data into the subintervals with the set interval step value specifically includes:

when D is less than a first threshold, the interval step value being a first step value;

when D is greater than or equal to the first threshold and less than a second threshold, the interval step value being a second step value;

when D is greater than or equal to the second threshold, the interval step value being a third step value, where the first threshold is less than the second threshold, the first step value is less than the second step value, and the second step value is less than the third step value.

Exemplarily, the first threshold is 1, and the second threshold is 3; the first step value is 0.2, and the second step value is 0.5, and the third step value is 1.

Exemplarily, in the method, a brightness curve fitting algorithm formula called when performing the brightness fitting curve according to the sampling data is a linear equation $y_a$=a+bx, where a and b are both undetermined parameters, $$a=\frac{\sum y}{n}-b\frac{\sum x}{n},$$

$$b=\frac{n\sum xy-\sum x\sum y}{n\sum x^2-\left(\sum x\right)^2},$$

x is the current parameter X, and ya is the standard illuminance value.

Exemplarily, after outputting the first version of brightness algorithm formula according to the brightness fitting curve, the method further includes a step of verifying the brightness fitting curve and the first version of brightness algorithm formula, and the step specifically includes:

obtaining a correlation coefficient R value or calculating a relative error value in a case that the brightness fitting curve is fitted;

in a case that the correlation coefficient R value is greater than 0.99 or the relative error value is less than or equal to ±20%, determining that the brightness fitting curve meets an allowable condition, otherwise determining that the brightness fitting curve and the first version of brightness algorithm formula do not meet the allowable condition; and in a case that the brightness fitting curve and the first version of brightness algorithm formula do not meet the allowable condition, removing bad points in the plurality of groups of sampling data, and/or lowering the interval step value, and performing brightness curve fitting again until the brightness fitting curve and the first version of brightness algorithm formula meet the allowable condition.

Exemplarily, the obtaining the brightness algorithm formula of the photosensitive sensor of each of the test module specifically includes:

performing sampling for a plurality of times within the standard illuminance value region to obtain a plurality of groups of sampling data, where the photosensitive sensor includes a shaded sensor that is shaded and a unshaded sensor that is not shaded, collecting a illuminance value Yj by an illuminance meter during each sampling process, and collecting a unshaded current initial value $L_j$ of the unshaded sensor and a shaded current initial value $I_j$ of the shaded sensor in real time, where the unshaded current initial value $L_j$ is converted into a count value as a current parameter X, the illuminance value Yj collected by the illuminance meter is a standard illuminance value Y, and each group of sampling data includes the standard illuminance value Y, and the corresponding unshaded current initial value $L_j$ and the shaded current initial value $I_j$ under the standard illuminance value Y;

obtaining, according to the plurality of groups of sampling data, a corresponding relation table of a corresponding relation between the unshaded current initial value $L_j$ and the standard illuminance value Y;

fitting the plurality of groups of sampling data to obtain a brightness fitting curve;

obtaining, according to the brightness fitting curve, a first version of brightness algorithm formula;

storing the first version of brightness algorithm formula and the corresponding relation table as a backup database.

Exemplarily, the performing, according to the brightness algorithm formula, ambient light detection by the photosensitive sensor specifically includes:

obtaining, in a real time manner, a real-time unshaded current value $L_j'$ and a real-time shaded current value $I_j'$ fed back by the photosensitive sensor;

using the real-time unshaded current value $L_j'$ as the current parameter X, and substituting the current parameter X into the first version of brightness algorithm formula in the backup database to obtain a predicted brightness value Y';

inquiring, according to the predicted brightness value Y', the shaded current initial value $I_j$ corresponding to the predicted brightness value Y' in the corresponding relation table;

calculating a difference value Δ between the real-time shaded current value $I_j'$ and the inquired shaded current initial value $I_j$ as a compensation value;

using a difference value between the real-time unshaded current value $L_j'$ and the compensation value as a target real-time current parameter X';

substituting the target real-time current parameter X' as the current parameter X into the first version of brightness calculation formula, and reporting points to obtain a target brightness value.

Exemplarily, the fitting the plurality of groups of sampling data to obtain the brightness fitting curve specifically includes: performing fitting with a polynomial algorithm formula to obtain the brightness fitting curve.

Exemplarily, the polynomial algorithm formula is as follows:

$$y=a_0+a_1x+\ldots+a_kx^k;$$

where $$\begin{bmatrix}1 & x_1 & \ldots & x_1^k\\ 1 & x_2 & \ldots & x_2^k\\ \vdots & \vdots & \ddots & \vdots\\ 1 & x_n & \ldots & x_n^k\end{bmatrix}\begin{bmatrix}a_0\\ a_1\\ \vdots\\ a_k\end{bmatrix}=\begin{bmatrix}y_1\\ y_2\\ \vdots\\ y_n\end{bmatrix},$$

x is the current parameter X, and y is the standard illuminance value.

An embodiment of the present disclosure also provides a computer device, including a memory and a processor, and a computer program stored on the memory and executable on the processor, where the computer program, when executed by the processor, implements the above-mentioned method.

An embodiment of the present disclosure also provides a computer-readable medium, which stores a computer program, where the computer program, when executed by a processor, implements the above-mentioned method.

The beneficial effects brought by the embodiments of the present disclosure are as follows:

The embodiments of the present disclosure provide a brightness detection method, a computer device and a readable medium. Each of display modules on the display module production line is separately tested to obtain a set of brightness algorithm formula of photosensitive sensor belonging to the each display module, which effectively avoids the problem of inter-chip difference, and avoids the problem on poor universality of algorithm formula caused by inconsistency of photosensitive device performances in different display modules, namely, the performance difference of photosensitive sensors among the chips; well avoids the problem of "zero point" drift, because each of display modules has its own corresponding set of brightness algorithm formula, and it does not require the condition of inter-chip difference.

DETAILED DESCRIPTION

Figure 1:
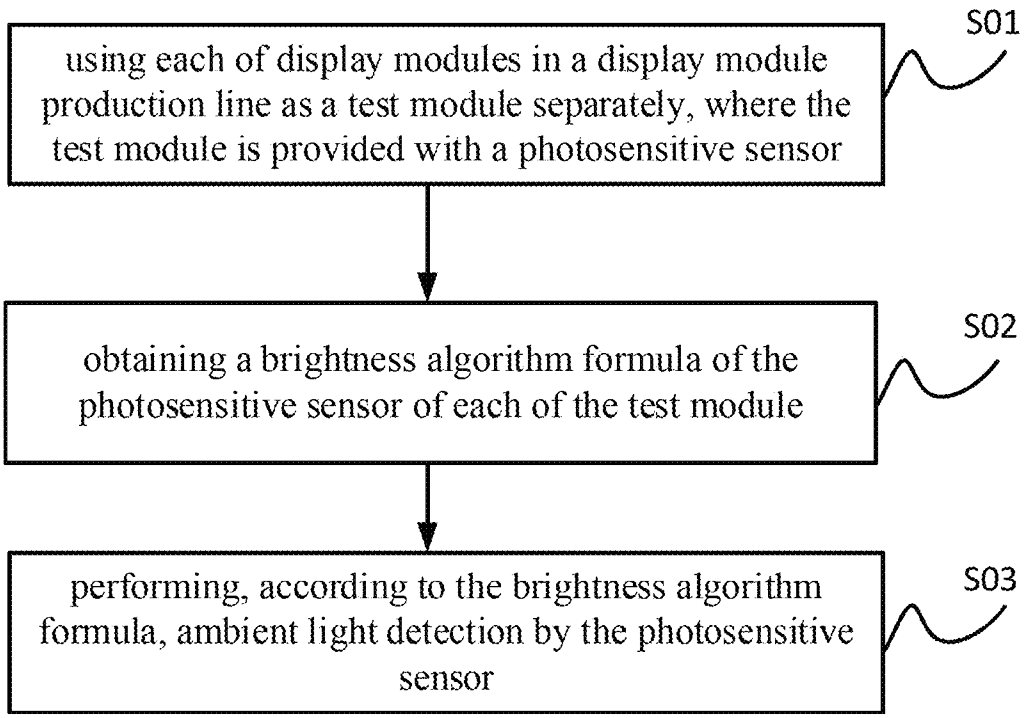
FIG. 1 shows a flowchart of a brightness detection method provided by an embodiment of the present disclosure.

In order to make the purpose, technical solutions and advantages of the embodiments of the present disclosure clearer, the technical solutions in the embodiments of the present disclosure will be described clearly and completely in conjunction with the drawings in the embodiments of the present disclosure. Obviously, the described embodiments are a part of the embodiments of the present disclosure, but not all of the embodiments. Based on the described embodiments of the present disclosure, all other embodiments obtained by those ordinarily skilled in the art without creative effort shall fall within the protection scope of the present disclosure.

Unless otherwise defined, the technical terms or scientific terms used in the present disclosure shall have the usual meanings understood by those skilled in the art to which the present disclosure belongs. "First", "second" and similar words used in the present disclosure do not indicate any order, quantity or importance, but are only used to distinguish different components. Similarly, words like "a", "an" or "the" do not denote a limitation of quantity, but mean that there is at least one. "Comprising" or "including" and similar words mean that the elements or items appearing before the word include the elements or items listed after the word and their equivalents, without excluding other elements or items. Words such as "connect" or "link" are not limited to physical or mechanical connections, but may include electrical connections, whether direct or indirect. Such terms as "up", "down", "left", "right" are only used to indicate the relative positional relationship. When the absolute position of the described object changes, the relative positional relationship may also change accordingly.

Before describing in detail the brightness detection method, computer device, and readable medium provided by the embodiments of the present disclosure, it is necessary to describe related technologies as follows:

In the related art, many handheld devices (such as tablet computers and mobile phones, etc.) are equipped with a photosensitive sensor. The photosensitive sensor can detect the ambient light brightness of the handheld device, and the handheld device can automatically adjust the screen brightness according to the detected ambient light brightness, thereby saving energy and bringing the best visual effect to the user.

Based on the necessity of sensing the ambient light, a photosensitive sensor is integrated onto a display module, which can save costs, and is conducive to the realization of a full screen, thereby increasing the competitiveness of display products. The basic principle of the photosensitive sensor for ambient light detection is based on the photosensitive characteristics of the photosensitive sensor. The carrier transition states of the PN junction of the photosensitive sensor are different under different light irradiations, and the brightness of the current ambient light is calculated by detecting the output current size of the PN junction.

However, in related technologies, a TFT (Thin Film Transistor) device is used in the photosensitive sensor. Due to its semiconductor characteristics, there will be the following difficult problems:

(1) Inter-chip difference: in the related art, on the display module production line, several display modules are randomly sampled, a brightness algorithm is established for the several display modules that have been sampled, and the algorithm is applied to display modules that have not been sampled. However, the process differences of photosensitive sensors in display modules will cause inter-chip differences between performances of the photosensitive sensors, that is, there is a difference in the performances of the photosensitive sensors between different display modules. If a TFT device is a display TFT, this difference is within the Spec (specification) range, but for the photosensitive performance of the photosensitive sensor, such difference will affect the applicability of the brightness calculation formula onto each module.

(2) "Zero point" drift: in the brightness algorithm of the photosensitive sensor in the related art, it is necessary to remove the inter-chip difference and calibrate the "zero point" according to the difference value between the shaded current and the unshaded current of each display module in the Dark state (dark state). However, tested data in the related art shows that a photosensitive sensor has the problem of "zero point" drift, that is, the difference value between the unshielded current and the shielded current of a same display module obtained in the Dark state is not stable in multiple tests.

In order to solve the above-mentioned problems, embodiments of the present disclosure provide a brightness detection method, a computer device and a readable medium, which can greatly improve the accuracy of brightness detection of a photosensitive sensor by improving the brightness algorithm of the photosensitive sensor.

The brightness detection method provided by an embodiment of the present disclosure includes the following steps.

Step S01, using each of display modules in a display module production line as a test module separately, where the test module is provided with a photosensitive sensor; the photosensitive sensor may be integrated into the display module.

Step S02, obtaining a brightness algorithm formula of the photosensitive sensor of each of the test module; that is to say, establishing the corresponding brightness algorithm formula of each of the test modules separately.

Step S03, performing, according to the brightness algorithm formula, ambient light detection by the photosensitive sensor.

Step S01 and Step S02 may be completed on the display module production line, which are stored in the display module after obtaining the brightness algorithm formula. Step S03 may be performed during the usage of client. When in use, the photosensitive sensor detects the ambient light brightness according to the brightness algorithm formula, so as to realize the purpose of automatically adjusting the brightness of the screen.

In the above-mentioned scheme, each of display modules on the display module production line is separately tested to obtain a set of brightness algorithm formula of photosensitive sensor belonging to the each display module. In such manner, even if there are differences between the photosensitive sensors in different display modules, the problem of inter-chip difference can be effectively avoided, because each of display modules has a its own corresponding set of brightness algorithm formula separately, thereby to avoid the inconsistency of performances of photosensitive devices due to different display modules, that is, to avoid the problem of poor universality of the algorithm formula caused by the performance difference of photosensitive sensors among the chips.

Moreover, the reason for the "zero point" drift problem lies in that in the brightness algorithm of photosensitive sensor in the related art, it is necessary to remove the inter-chip difference according to the difference value between the shaded current and the unshaded current of each of display modules in the Dark state (dark state), that is, to calibrate the "zero point". However, when "zero point" calibration is performed on each of test modules, for a single test module, due to the drift of semiconductor characteristics thereof, there are changes on the mathematical relationship between the unshaded current X and the illuminance value Y fed back by each test, the current is unstable, that is, there is a problem of "zero point" drift. However, in the brightness detection method provided by the embodiments of the present disclosure, since each of display modules is separately provided with its own set of brightness algorithm formula, it is not required to remove the inter-chip difference, that is to say, there is no need to perform "zero point" calibration for the inter-chip difference. Therefore, the influence brought by the "zero point" drift in the related technology can be avoided.

In addition, the brightness algorithm of photosensitive sensor in the related art does not support the brightness calculation of the high-brightness interval (for example, the brightness interval with illuminance between 10001 LUX~3000 LUX), while it is difficult to control the accuracy of the low-brightness interval (for example, the brightness interval with illuminance between 0~20 LUX) and middle-brightness interval (for example, the brightness interval with illuminance between 21 LUX~10000 LUX) to be within ±20%. In this way, because the photosensitive sensor is usually a TFT device, semiconductor characteristic thereof makes the photosensitive sensor sensitive in the low-brightness interval, and insensitive in the high-brightness interval, which causes the existing brightness algorithm to be inapplicable to the low-brightness interval and the high-brightness interval, thereby directly affecting the accuracy of brightness detection. Therefore, in order to further solve the problem of inaccuracy of brightness detection caused by that the brightness algorithm of the photosensitive sensor in the display module in the above-mentioned related art is not applicable to the bright detection in the low-brightness interval and the high-brightness interval, some embodiments of the present disclosure provide a brightness detection method, and the brightness algorithm thereof can be applied to the low-brightness interval and high-brightness interval, so as to improve the accuracy.

As shown in FIG. 1, the brightness detection method provided by some embodiments of the present disclosure may specifically include the following steps:

Step S01, using each of display modules in a display module production line as a test module separately, where the test module is provided with a photosensitive sensor;

Step S02, obtaining a brightness algorithm formula of the photosensitive sensor of each of the test module; and Step S03, performing, according to the brightness algorithm formula, ambient light detection by the photosensitive sensor.

Exemplarily, the above step S02 specifically includes the following steps:

Step S021, performing sampling for a plurality of times within a standard illuminance value region to obtain a plurality of groups of sampling data, where each group of sampling data includes a standard illuminance value Y and a current parameter X fed back by the photosensitive sensor under the standard illuminance value Y;

Step S022, dividing, according to a size of the standard illuminance value Y, the plurality of groups of sampling data into sampling data in a low-brightness interval, sampling data in a middle-brightness interval and sampling data in a high-brightness interval;

Step S023, performing segmented curve fitting according to the sampling data in the low-brightness interval, the sampling data in the middle-brightness interval and the sampling data in the high-brightness interval, to obtain a first curve segment corresponding to the sampling data in the low-brightness interval, a second curve segment corresponding to the sampling data in the middle-brightness interval, and a third curve segment corresponding to the sampling data in the high-brightness interval; and Step S024, combining the first curve segment, the second curve segment and the third curve segment to obtain a brightness fitting curve; and outputting, according to the brightness fitting curve, a first version of brightness algorithm formula.

In the above-mentioned scheme, current sampling is performed on the test module under different illuminance values to obtain multiple groups of sampling data; then the multiple groups of sampling data are classified into sampling data in a low-brightness interval, sampling data in a middle-brightness interval and sampling data in a high-brightness interval according to the size of illuminance values, for example: the illuminance of the low-brightness interval is between (0~20) LUX, the illuminance of the middle-brightness interval is between (21~10000) LUX, and the illuminance of the high-brightness interval is between (1000~130000) LUX. The brightness curve fitting is performed separately on the sampling data in the low-brightness interval, the sampling data in the middle-brightness interval, and the sampling data in the high-brightness interval, that is, the brightness curve is performed by segmented fitting, thereby greatly improving the accuracy of the brightness algorithm of the low-brightness interval and the high-brightness interval.

It should be noted that in step S021, the standard illuminance value Y of the photosensitive sensor on the test module may be collected by an illuminance meter and uploaded to a detection system of the upper-layer computer. The photosensitive sensor outputs current signals to the detection system of the upper-layer computer in real time at different standard illuminance values Y, so as to obtain corresponding current parameters X under different standard illuminance values Y.

Exemplarily, the photosensitive sensor includes a shaded sensor that is shaded and a unshaded sensor that is not shaded, and step S021 specifically includes:

collecting a illuminance value Yj by an illuminance meter and taking it as the standard illuminance value Y during each sampling process, and collecting a unshaded current $L_j$ of the unshaded sensor and a shaded current $I_j$ of the shaded sensor in real time; and using a difference value Xj between the unshaded current $L_j$ and the shaded current $I_j$ as a current parameter X.

In the above-mentioned scheme, the photosensitive sensor may be designed by two groups of TFT sensors, one group of TFTs is designed as a shaded sensor that is shaded (for example, the shaded sensor may be shaded by a black matrix), and the shaded sensor may be used as a reference group of TFTs, where the current $I_j$ is outputted to the detection system of the upper-layer computer; the other group is designed as an unshaded sensor that is not shaped, which is used as a photosensitive group TFT, where the current $L_j$ is outputted to the detection system of the upper-layer computer.

The standard illuminance value region may refer to a full illuminance value region that covers low-brightness values, middle-brightness values and high-brightness values. During a plurality of sampling, the standard illuminance meter value $Y_j$ of the photosensitive sensor on the test module is collected by the illuminance meter and to the detection system of the upper-layer computer. In order to ensure the accuracy and application scope of the subsequent fitting formula, in some embodiments, the standard illuminance value interval may be between 0~30000 LUX, and the quantity of sampling may be 100 times, so as to obtain the current parameter X value corresponding to 100 LUX samples of the standard illuminance value between 0~30000 LUX. For example, if the standard illuminance value is in the interval of 0~20 LUX, sampling is performed for 20 times to obtain 20 current parameter X values; the standard illuminance value is in the interval of 21 LUX~1000 LUX, sampling is performed for 60 times to obtain 60 current parameter X values; the standard illuminance value is in the interval of 1001 LUX~10000 LUX, sampling is performed for 10 times to obtain 10 current parameter X values; and the standard illuminance value is in the interval of 10001 LUX~30000 LUX, sampling is performed for 10 times to obtain 10 current parameter X values.

Of course, it can be understood that the above is only an example, and the above is only an example for the size interval division of standard illuminance values and the quantity of sampling in each interval. In practical applications, the interval division of standard illuminance values and the quantity of sampling in each interval are not limited to this.

Moreover, due to the semiconductor characteristics of the photosensitive sensor, there is a drift characteristic. In the above embodiments, the difference value between the unshaded current $L_j$ and the shaded current $I_j$ may be used as the value of current parameter X for performing the subsequent curve fitting and brightness calculation, which can reduce the drift characteristic caused by the semiconductor characteristics of the photosensitive sensor.

It should be noted that, in some other embodiments, the current parameter X may also be the unshaded current $L_j$. Using the difference value between the unshaded current $L_j$ and the shaded current $I_j$ as the current parameter X has the smaller influence on characteristic drift and the higher brightness detection accuracy than using the unshaded current $L_j$ as the current parameter X.

Exemplarily, the above step S023 specifically includes the following steps: performing brightness curve fitting on each group of sampling data in the low-brightness interval to obtain the first curve segment; dividing the middle-brightness interval into subintervals, and performing brightness curve fitting on multiple groups of sampling data in the subintervals to obtain the second curve segment; and dividing the high-brightness interval into subintervals, and performing brightness curve fitting on multiple groups of sampling data in the subintervals to obtain the third curve segment.

In the above scheme, the photosensitive sensor is relatively sensitive in the low-brightness interval, and has the slow change in the high-brightness interval. Firstly, the plurality of groups of sampling data may be classified according to the size of the standard illuminance values, which are divided into the low-brightness interval, the middle-brightness interval and the high-brightness interval, where a brightness curve fitting may be performed separately in the low-brightness interval, preferably, the brightness curve fitting may be performed on each of groups of sampling data in the low-brightness interval, that is, it is refined to each of groups of sampling data corresponding to a brightness formula for performing curve fitting when performing brightness curve fitting on the low-brightness interval, so that the accuracy of the brightness curve in the low-brightness interval can be better ensured.

Figure 2:
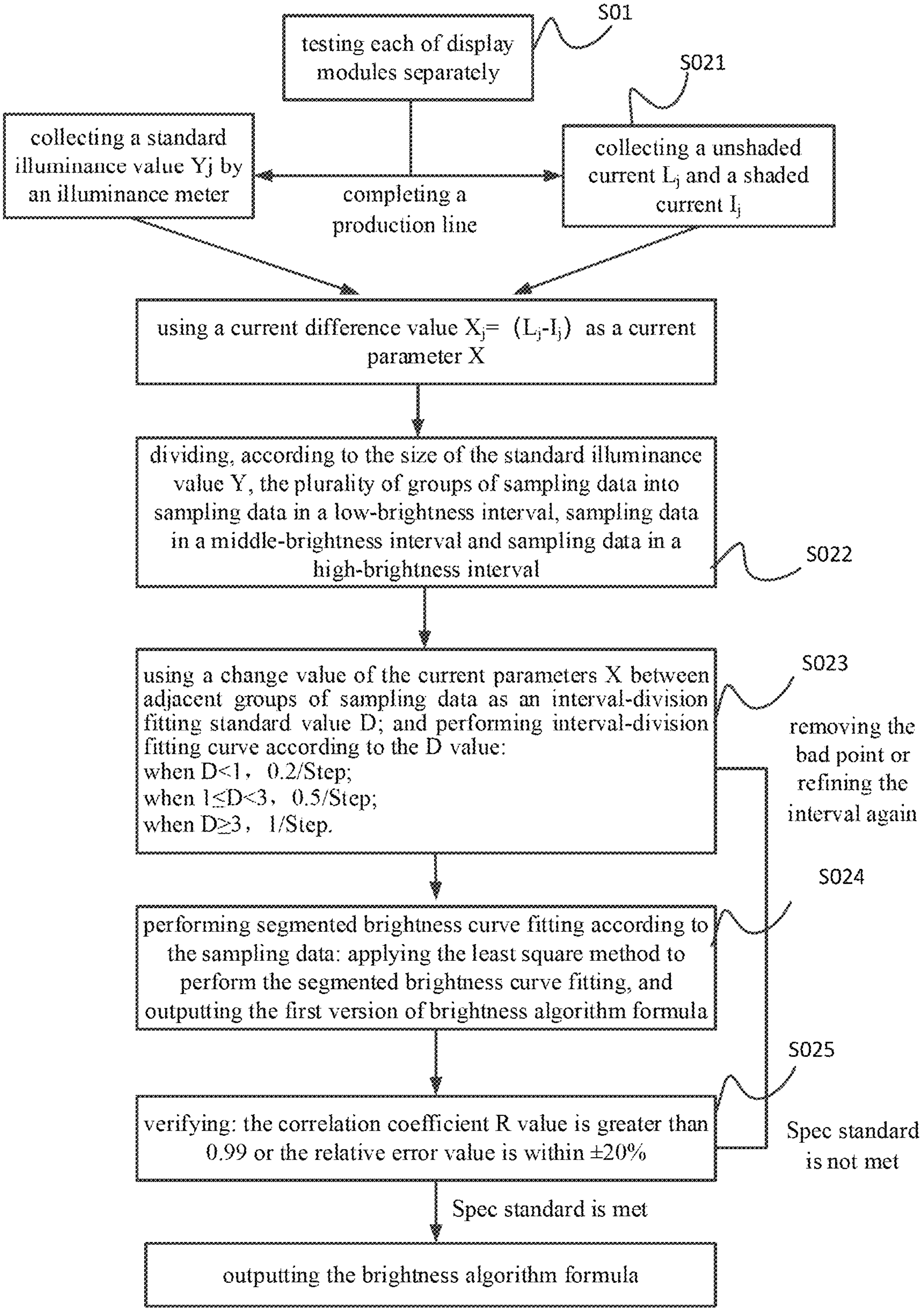
FIG. 2 shows a flowchart of a brightness detection method in an embodiment provided by the present disclosure.

Interval-division fitting may be performed on the sampling data in the middle-brightness interval and the high-brightness interval, specifically and exemplarily, referring to FIG. 2, the above step S023 may include:

using a change value $$\frac{X_{j+1}-X_j}{Y_{J+1}-Y_J}$$

of current parameters X between adjacent groups of sampling data in the middle-brightness interval and the high-brightness interval as an interval-division fitting standard value D; and dividing, according to the interval-division fitting standard value D, the multiple groups of sampling data into the subintervals with a set interval step value.

In the above scheme, both the middle-brightness interval and high-brightness interval may be divided into subintervals according to the D value, that is, the D value is equal to the change of the current difference value between adjacent groups of sampling data:

$$D=\frac{X_{j+1}-X_j}{Y_{J+1}-Y_J}.$$

The D value is used as the interval-division standard for interval-division fitting, and interval-division fitting may be performed by applying different step lengths according to the size of the D value.

Exemplarily, when D is less than a first threshold, the interval step value is a first step value; when D is greater than or equal to the first threshold and less than a second threshold, the interval step value is a second step value; when D is greater than or equal to the second threshold, the interval step value is a third step value, where the first threshold is less than the second threshold, the first step value is less than the second step value, and the second step value is less than the third step value.

Exemplarily, the first threshold is 1, the second threshold is 3; the first step value is 0.2, the second step value is 0.5, and the third step value is 1.

In the above scheme, the entire standard illuminance value region is segmented and subjected to the brightness curve fitting, when the interval-division fitting is performed on the middle-brightness interval and the high-brightness interval, the selection of D value size and step length may be as follows: when $D<1$, 0.2/Step; when $1\le D<3$, 0.5/Step; when $D\ge 3$, 1/Step. This interval-division fitting scheme can ensure the accuracy of the brightness curve fitting in the middle-brightness interval and the high-brightness interval. It should be understood that the selection of the above-mentioned D value size and step length is an exemplary embodiment, which may be obtained according to empirical values fitted by brightness algorithms. In other embodiments, the selection of the D value size and the step length are not limited thereto.

In addition, in step S024 in the method, the brightness fitting curve is performed according to the sampling data, and the brightness curve fitting algorithm formula as called is $y_a=a+bx$, where a and b are both undetermined parameters, $$a=\frac{\sum y}{n}-b\frac{\sum x}{n},$$

-continued $$b=\frac{n\sum xy-\sum x\sum y}{n\sum x^2-\left(\sum x\right)^2},$$

X is the current parameter X, and ya is the standard illuminance value.

In the above scheme, according to the subintervals of low-brightness interval, middle-brightness interval and high-brightness interval, brightness curve fitting is performed on the illuminance meter Y value and current parameter X value as collected by calling the brightness curve fitting algorithm, where the mathematical basis of the brightness curve fitting algorithm is that the sum of squared deviations between the actual value and the trend value is the smallest, that is, the least square method, and the brightness curve is fitted according to this algorithm.

Specifically, it is assumed that a linear equation is $y_a=a+bx$, where a and b are both undetermined parameters, the estimated dependent variable y can be obtained by substituting the given independent variable x into the above equation. The dependent variable y is not a definite number, but a possible value, which is the average number of multiple y, so it can be represented by $y_a$. When x takes a certain value, y has multiple possible values. Therefore, the y value obtained after substituting the given independent variable x value into the equation can be regarded as a type of average number or expected value.

The specific method of matching the linear equation is as follows:

$$Q=\Sigma(y-y_a)^2=\text{minimum value} \tag{I}$$

substituting the linear equation $y_a=a+bx$ into formula (I) to get:

$$Q=\Sigma(y-a-bx)^2=\text{minimum value}$$

obtaining the partial derivative of Q with respect to a and the partial derivative of Q with respect to b, respectively, and setting them equal to 0:

$$\begin{cases}\frac{\partial Q}{\partial a}=\sum 2(y-a-bx)(-1)=0\\ \frac{\partial Q}{\partial b}=\sum 2(y-a-bx)(-x)=0\end{cases} \tag{III}$$

obtaining, after sorting out formula (III), the following equation set:

$$\begin{cases}\sum y=na+b\sum x\\ \sum xy=a\sum x+b\sum x^2\end{cases} \tag{IV}$$

obtaining, according to the known x, y substitution formula (IV), two parameters a and b:

$$\begin{cases}b=\frac{n\Sigma xy-\Sigma x\Sigma y}{n\Sigma x^2-(\Sigma x)^2}\\ a=\frac{\Sigma y}{n}-b\frac{\Sigma x}{n}.\end{cases} \tag{V}$$

During the brightness fitting, the independent variable x is the current parameter X, and the current parameter X is the difference value between the unshaded current $L_j$ and the shaded current $I_j$; the dependent variable y is the standard illuminance value Y.

In the above scheme, the difference value between the unshaded current $L_j$ and the shaded current $I_j$ is used as the independent variable x in the formula, which can avoid the error caused by the characteristic drift to a certain extent, and improve the accuracy to a large extent, so as to ensure the accuracy of brightness detection of the photosensitive unit.

For example, refer to FIG. 2, after step S024, the method further includes: step S025, verifying the brightness fitting curve and the first version of brightness algorithm formula.

Refer to FIG. 2, the step S025 may specifically include:
- obtaining a correlation coefficient R value or calculating a relative error value when the brightness fitting curve is fitted;
- in a case that the correlation coefficient R value is greater than 0.99 or the relative error value is less than or equal to ±20%, determining that the brightness fitting curve meets an allowable condition, otherwise, determining that the brightness fitting curve and the first version of brightness algorithm formula do not meet the allowable condition; and
- in a case that the brightness fitting curve and the first version of brightness algorithm formula do not meet the allowable condition, removing bad points in the plurality of groups of sampling data, and/or lowering the interval step value (that is, further refining the subinterval), and performing brightness curve fitting again until the brightness fitting curve and the first version of brightness algorithm formula meet the allowable condition, and outputting the final brightness algorithm formula.

In the above scheme, the correlation coefficient R value may be obtained during brightness curve fitting; the relative error calculation may also be performed, and when R>0.99 or the accuracy is ≤±20%, it is determined that the Spec (allowable range) standard is met, the first version of brightness algorithm formula can be output to form a FW, and the FW can be burned into the display module; when the Spec standard is not met, the first version of brightness algorithm formula needs to be corrected. If there is a single bad point, the bad point is just removed; if there is a segmented trend, algorithm formula fitting is re-performed on refined subintervals in the existing interval until the Spec standard is met. In this way, the first version of brightness algorithm formula is verified and the Spec standard is set, so that the accuracy of the brightness algorithm is greatly improved.

Figure 3:
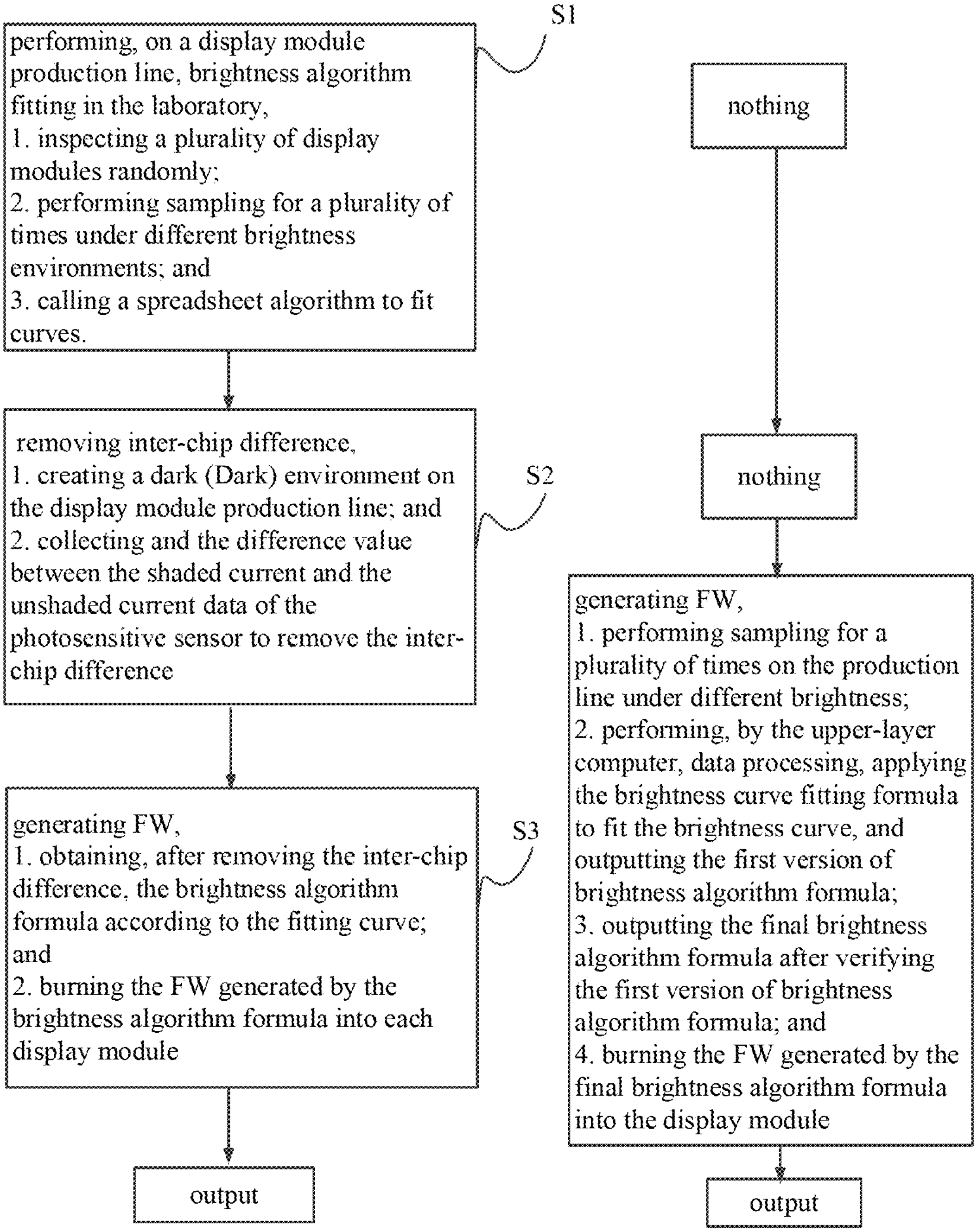
FIG. 3 is a chart showing a comparison between flows of a brightness algorithm scheme in the related art and a brightness detection method provided by an embodiment of the present disclosure.

FIG. 3 is a chart showing a comparison between flows of the brightness algorithm scheme in the related art and the brightness detection method provided by the embodiment of the present disclosure. FIG. 3 contains two parts: (a) and (b), where chart (a) shows a schematic flow chart of the brightness algorithm scheme in the related art; (b) shows a flow chart of the brightness detection method provided in the embodiment of the present disclosure.

As shown in FIG. 3(*a*), the process of the acquisition stage of the brightness algorithm formula in the related art is as follows:
- Step S1, performing, on a display module production line, brightness algorithm fitting in the laboratory, where at least 10 display modules were randomly inspected as test modules, and multiple groups of sampling data were obtained by performing sampling for multiple times under different brightness environments, and a spreadsheet algorithm (such as the least square method) is called to fit curves according to the multiple groups of sampling data;
- Step S2, removing an inter-chip difference, where a dark (Dark) environment is created on the display module production line, and the difference value between shaded current data and unshaded current data of the photosensitive sensor is collected to remove the inter-chip difference; and
- Step S3, generating FW, where after removing the inter-chip difference, the brightness algorithm formula is obtained according to the fitting curve, and the FW generated by the brightness algorithm formula is burned into each display module.

As shown in FIG. 3(*b*), the process of the acquisition stage of the brightness algorithm formula in the brightness detection method provided by the embodiment of the present disclosure is as follows:
- collecting, in the production line, sampling data under different brightness values for each display module;
- performing, by a upper-layer computer, data processing on the sampling data, calling the brightness curve fitting algorithm to perform the brightness curve fitting, and obtaining the first version of brightness algorithm formula according to the brightness curve; and
- burning the brightness algorithm formula obtained after verifying the first version of brightness algorithm formula into the display module.

The two boxes "nothing" in FIG. 3 (*b*) have no practical significance and are only used for comparison with FIG. 3 (*a*). As shown in FIG. 3, the acquisition stage (i.e., step S02) of the brightness algorithm formula of the display module in the method provided by the embodiment (shown in FIG. 3 (*b*)) and the brightness algorithm formula of the display module in the related art (shown in FIG. 3 (*a*)) is completed before the display module of the display module production line is output. It can be seen from FIG. 3 and the above content that, compared with the brightness algorithm of the photosensitive sensor in the related art, the brightness detection method provided by the embodiment of the present disclosure saves laboratory steps.

Figure 4:
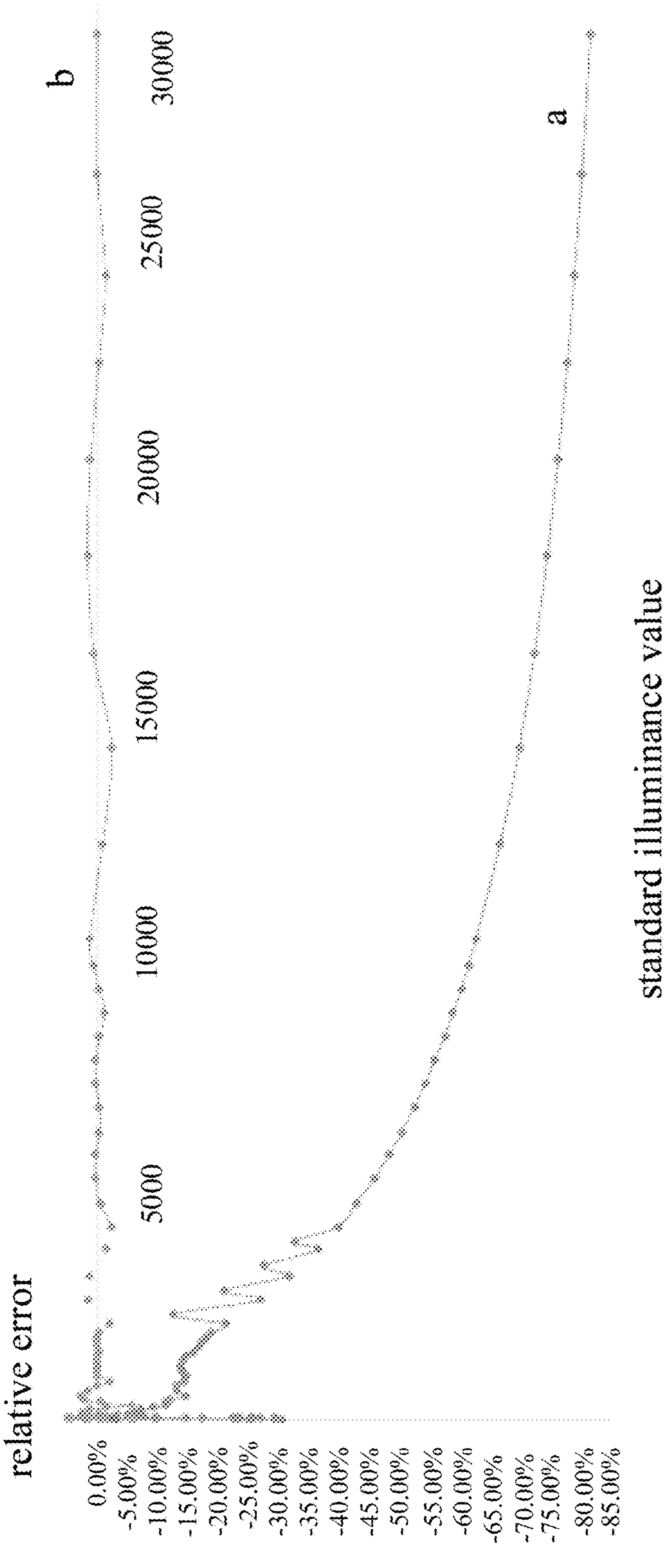
FIG. 4 is a diagram showing an accuracy comparison between a brightness algorithm formula of a display module in the related art and a brightness algorithm formula in the brightness detection method provided by the embodiment of the present disclosure.

FIG. 4 shows the accuracy comparison between the brightness algorithm formula of a display module in the related art and the brightness algorithm formula in the brightness detection method provided by the embodiments of the present disclosure, where the abscissa is the standard illuminance value, and the ordinate is the relative error value, curve a is a relative error value curve of the brightness algorithm formula in the related art, and curve b is a relative error value curve of the brightness algorithm formula in the method provided by the embodiment of the present disclosure.

Figure 5:
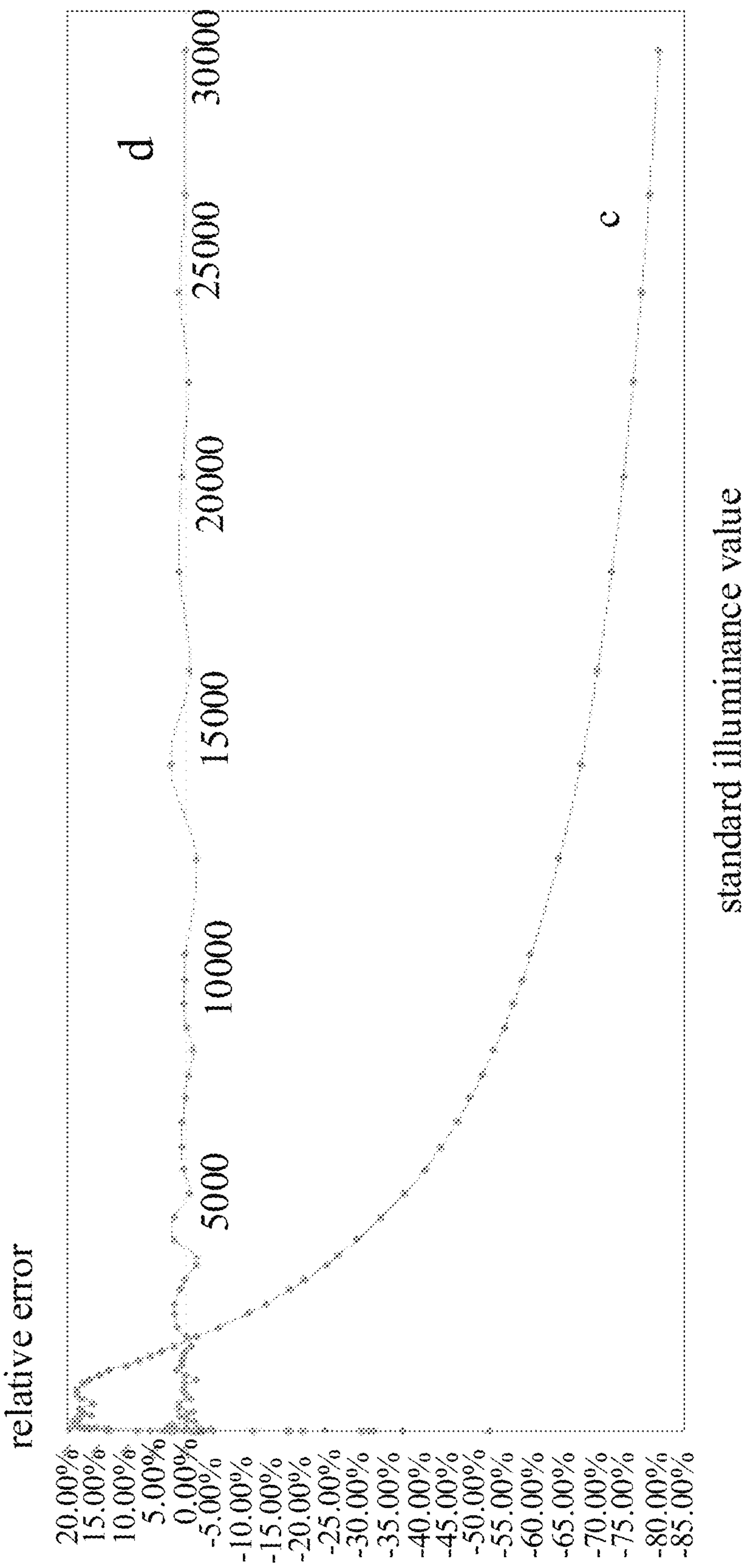
FIG. 5 is a diagram showing an accuracy comparison of the brightness algorithm formula of another display module in the related art and the brightness algorithm formula in the brightness detection method provided by the embodiment of the present disclosure.

FIG. 5 shows the accuracy comparison between the brightness algorithm formula of a display module in the related art and the brightness algorithm formula in the brightness detection method provided by the embodiment of the present disclosure, where the abscissa is the standard illuminance value, and the ordinate is the relative error value, curve c is a relative error value curve of the brightness algorithm formula in the related art, and curve d is a relative error value curve of the brightness algorithm formula in the method provided by the embodiment of the present disclosure.

It can be seen from FIG. 4 and FIG. 5 that, as compared with the brightness algorithm of the photosensitive sensor in the related art, the brightness detection method provided by the embodiment of the present disclosure can greatly improve the brightness detection accuracy.

In addition, in the above-mentioned embodiments, the brightness curve fitting is based on the size of the standard illuminance value, and multiple groups of sampling data are divided into subintervals, and the brightness curve fitting is performed in segments to obtain the first version of brightness algorithm formula. In this way, brightness curve fitting is performed on data in different intervals, and it is relatively cumbersome to call the brightness curve fitting algorithm formula in different intervals. If the display module appears a jump-point phenomenon, it will cause limited sampling data to be regarded as bad points and to be removed, which results in a problem of inaccurate fitting results.

In order to improve the above problem, other embodiments of the present disclosure also provide a brightness detection method, which uses polynomial fitting to describe the brightness, avoids using multiple linear fittings to describe the relationship in the entire standard illuminance interval, and omits the segmentation process, so that the algorithm fitting is more concise, and the connection of segmentation points does not need to be considered. This embodiment is described in more detail below.

In this embodiment, the brightness detection method includes the following steps:

Step S01, using each of display modules in a display module production line as a test module separately, where the test module is provided with a photosensitive sensor, where the photosensitive sensor may be integrated onto the display module;

Step S02, obtaining a brightness algorithm formula of the photosensitive sensor of each of the test module; that is to say, the corresponding brightness algorithm formula of each of the test modules is established separately; and Step S03, performing, according to the brightness algorithm formula, ambient light detection by the photosensitive sensor.

Figure 6:
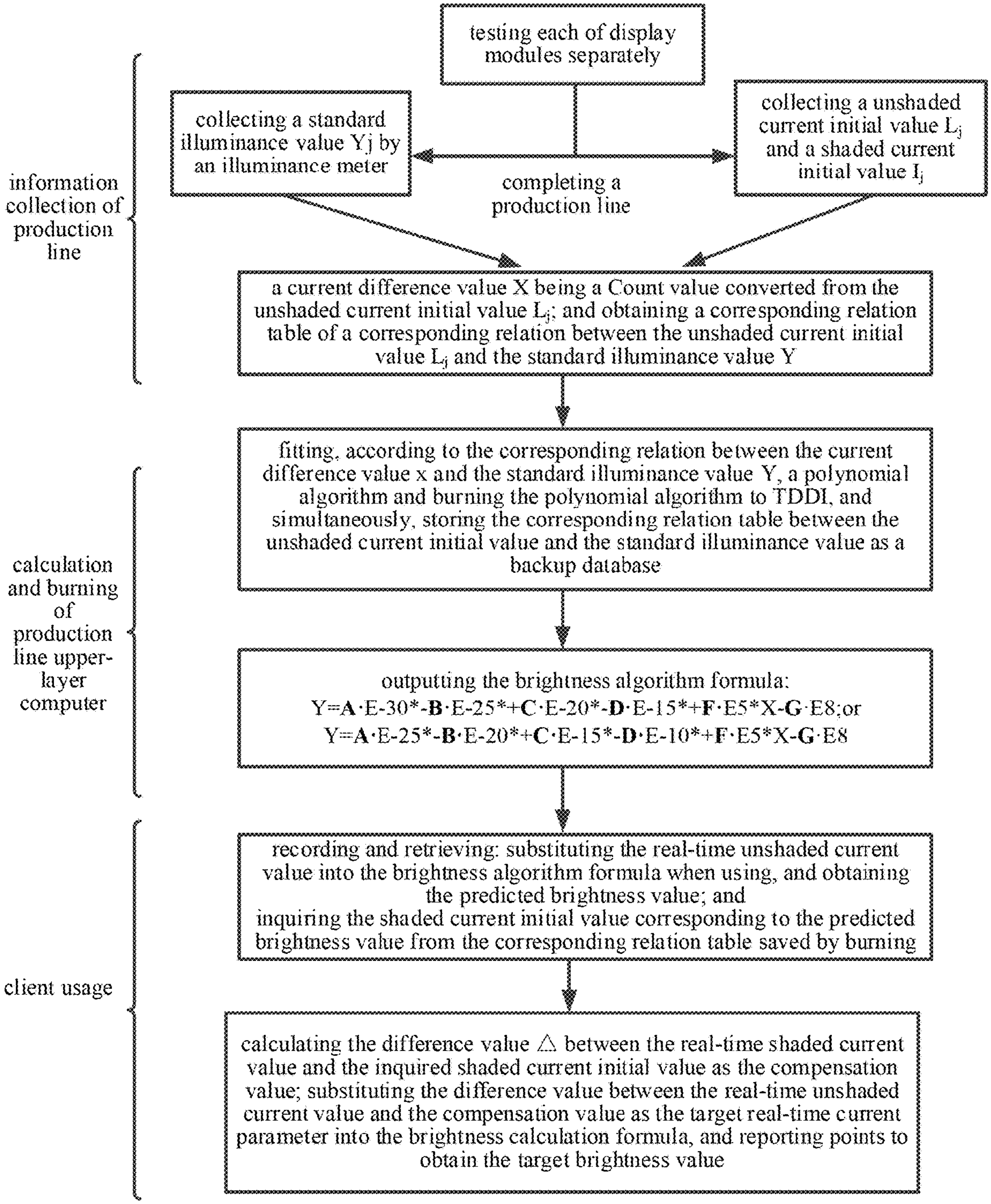
FIG. 6 shows a flowchart of a brightness detection method in an embodiment provided by the present disclosure.

FIG. 6 is a flowchart of the brightness detection method in the embodiment.

Refer to FIG. 6, in the embodiment, the above step S02 may specifically include the following steps:

Step S021', performing sampling for a plurality of times within the standard illuminance value region to obtain a plurality of groups of sampling data, where the photosensitive sensor includes a shaded sensor that is shaded and a unshaded sensor that is not shaded, collecting a illuminance value Yj by an illuminance meter during each sampling process, and collecting a unshaded current initial value $L_j$ of the unshaded sensor and a shaded current initial value $I_j$ of the shaded sensor in real time, where the unshaded current initial value $L_j$ is converted into a count value and as a current parameter X, the illuminance value Yj collected by the illuminance meter is a standard illuminance value Y, and each group of sampling data includes the standard illuminance value Y, and the corresponding unshaded current initial value $L_j$ and the shaded current initial value $I_j$ under the standard illuminance value Y;

Step S022', obtaining, according to the plurality of groups of sampling data, a corresponding relation table of a corresponding relation between the unshaded current initial value $L_j$ and the standard illuminance value Y;

Step S023', fitting the plurality of groups of sampling data to obtain a brightness fitting curve;

Step S024', obtaining, according to the brightness fitting curve, a first version of brightness algorithm formula; and Step S025', storing the first version of brightness algorithm formula and the corresponding relation table as a backup database.

Exemplarily, the step S03 may specifically include:'

Step S031, obtaining, in a real time manner, a real-time unshaded current value $L_j'$ and a real-time shaded current value $I_j'$ fed back by the photosensitive sensor;

Step S032, using the real-time unshaded current value $L_j'$ as the current parameter X, and substituting the current parameter X into the first version of brightness algorithm formula in the backup database to obtain a predicted brightness value Y';

Step S033, inquiring, according to the predicted brightness value Y', the shaded current initial value $I_j$ corresponding to the predicted brightness value Y' in the corresponding relation table;

Step S034, calculating a difference value Δ between the real-time shaded current value $I_j'$ and the inquired shaded current initial value $I_j$ as a compensation value;

Step S035, using a difference value between the real-time unshaded current value $L_j'$ and the compensation value as a target real-time current parameter X'; and Step S036, taking the target real-time current parameter X' as the current parameter X, substituting the target real-time current parameter X' into the first version of brightness calculation formula, and reporting points to obtain a target brightness value.

In the above scheme, the plurality of groups of sampling data do not need to be divided into subintervals, and a single fitting formula is used to perform brightness curve fitting on the plurality of groups of sampling data in the entire standard illuminance value interval, without calling different formulas for multi-segment curve fitting, which simplifies curve fitting process, thereby avoiding the tediousness of segmented fitting and the errors caused by the segmented process, so that the improved algorithm has high accuracy and a wider range of applications.

Figure 7:
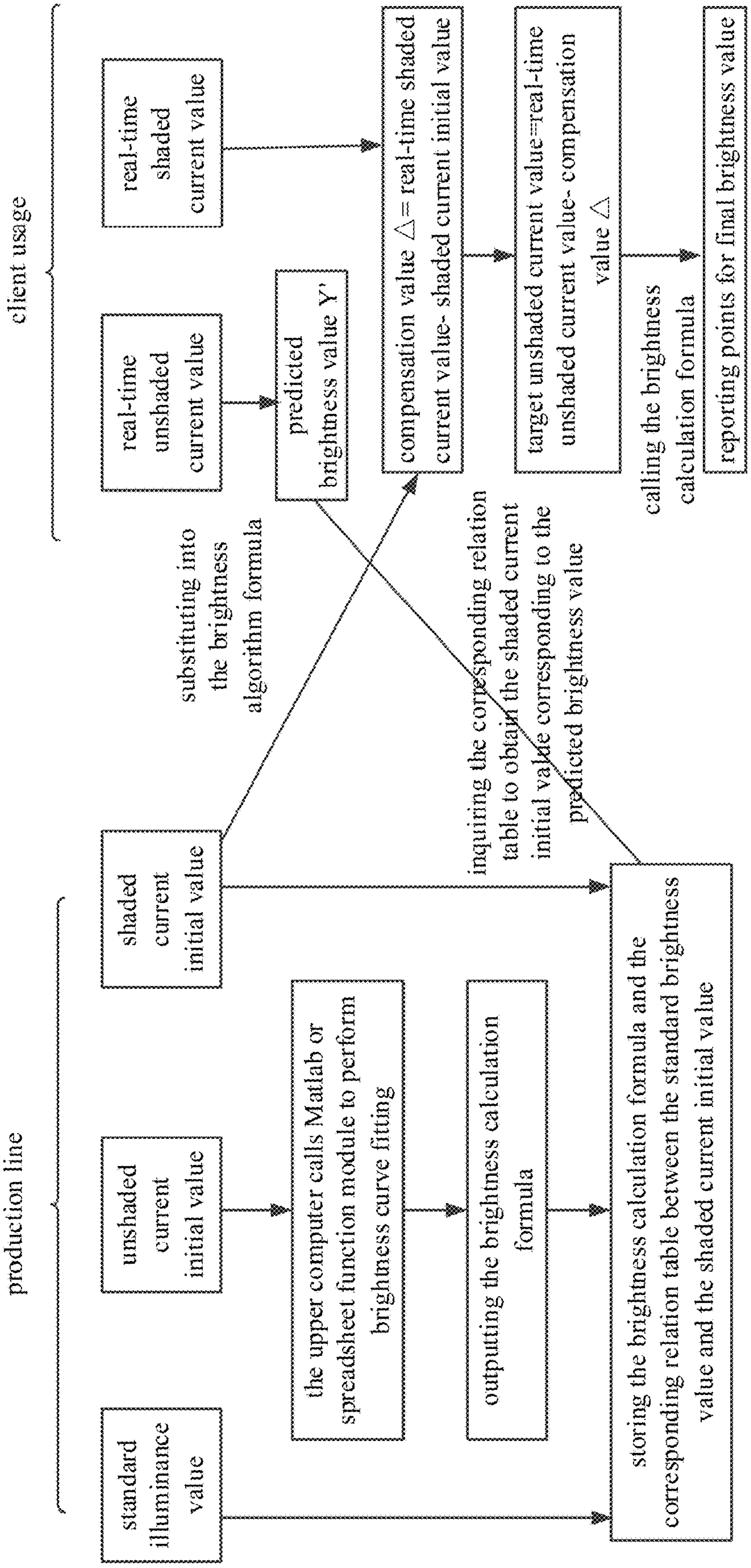
FIG. 7 shows a flowchart of the brightness algorithm in a regression calibration process in the embodiment shown in FIG. 6.

Moreover, in step S03, the regression calibration scheme is sampled during the use stage of the display module. The specific flow of the regression calibration process is shown in FIG. 7: storing the plurality of groups of sampling data during the sampling process on the production line; substituting, in the actual use of the client, the collected real-time unshaded current value into the formula to obtain a forecast brightness value Y', finding, according to the predicted brightness value Y', the corresponding shading initial value in the plurality of groups of sampling data as stored, using the difference value between the collected real-time shading value and the shading initial value as the A value, applying the A value to update the real-time unshaded value, substituting the real-time unshaded value updated into the first version of brightness algorithm formula, and reporting points for finally calculating to obtain the target brightness value Y. In this way, there is a regression calibration scheme, since the semiconductor characteristics of the photosensitive sensor on each of display module will generate its own characteristic drift problem, the above regression calibration scheme can apply the difference value calibration between the real-time shaded current value and the shaded current initial value corresponding to the predicted brightness value stored, and the drift value can be compensated by the difference value, so as to solve the problem of the characteristic drift of the photosensitive sensor itself.

It should be noted that, during the data sampling process in step S021', the photosensitive sensor may be designed by two groups of TFT sensors, one group of TFTs is designed as a shielded sensor that is shielded (for example, the shielded sensor may be shielded by a black matrix), and the shielded sensor may be used as a reference group of TFTs, where the current $I_j$ is outputted to the detection system of the upper-layer computer; the other group is designed as an unshielded sensor that is not shaped, which is used as a photosensitive group TFT, where the current $L_j$ is outputted to the detection system of the upper-layer computer.

The standard illuminance value region may refer to an illuminance value region that covers low-brightness values, middle-brightness values and high-brightness values. During a plurality of sampling, the standard illuminance meter value $Y_j$ of the photosensitive sensor on the test module is collected by the illuminance meter to the detection system of the upper-layer computer. In order to ensure the accuracy and application scope of the subsequent fitting formula, in some embodiments, the standard illuminance value interval may be between 0~30000 LUX, and the quantity of sampling may be 100 times, so as to obtain the current parameter X value corresponding to 100 LUX samples of the illuminance value between 0~30000 LUX. The unshielded current value, i.e., the unshielded current initial value $L_j$, is used as the X value for subsequent calculation, and it is necessary to store the unshielded current value $L_j$ in the next 100 groups of sampling data, so as to be called when the regression is predicted during subsequent use.

In addition, in this embodiment, exemplarily, the fitting the plurality of groups of sampling data to obtain a brightness fitting curve may specifically be fitting to obtain a brightness fitting curve by using a polynomial algorithm formula.

Specifically, the unshaded current initial value is taken as X, the brightness collected by the illuminance meter is taken as Y, brightness fitting is performed on the plurality of groups of sampling data collected, the fitting curve is selected according to the principle of the smallest sum of squared deviations, and the polynomial equation is used as the brightness curve fitting formula, which is referred to as the least square method.

The specific derivation process of the polynomial algorithm formula is as follows:

assumed the fitting polynomial is: $y=a_0+a_1x+\ldots+a_kx^k$ (I');

the sum of the distances from individual points to the curve, that is, the sum of squared deviations is:

$$R^2=\sum_{i=1}^{n}[y_i-(a_0+a_1x_i+\ldots+a_kx_i^k)]^2 \quad \text{(II')};$$

calculating the $a_i$ partial derivative on the right side of the equation (II'), simplifying the equation (II') into a matrix form, and obtaining the following Vandermonde matrix:

$$\begin{bmatrix} n & \sum_{i=1}^{n} x_i & \cdots & \sum_{i=1}^{n} x_i^k \\ \sum_{i=1}^{n} x_i & \sum_{i=1}^{n} x_i^2 & \cdots & \sum_{i=1}^{n} x_i^{k+1} \\ \vdots & \vdots & \ddots & \vdots \\ \sum_{i=1}^{n} x_i^k & \sum_{i=1}^{n} x_i^{k+1} & \cdots & \sum_{i=1}^{n} x_i^{2k} \end{bmatrix} \begin{bmatrix} a_0 \\ a_1 \\ \vdots \\ a_k \end{bmatrix} = \begin{bmatrix} \sum_{i=1}^{n} y_i \\ \sum_{i=1}^{n} x_i y_i \\ \vdots \\ \sum_{i=1}^{n} x_i^k y_i \end{bmatrix} \quad \text{(III')}$$

after simplifying the above formula (III'), the following can be obtained:

$$\begin{bmatrix} 1 & x_1 & \cdots & x_1^k \\ 1 & x_2 & \cdots & x_2^k \\ \vdots & \vdots & \ddots & \vdots \\ 1 & x_n & \cdots & x_n^k \end{bmatrix} \begin{bmatrix} a_0 \\ a_1 \\ \vdots \\ a_k \end{bmatrix} = \begin{bmatrix} y_1 \\ y_2 \\ \vdots \\ y_n \end{bmatrix} \quad \text{(IV')}$$

That is to say, X·A=Y, then $A=(X'\cdot X)^{-1}\cdot(X'\cdot Y)$, thereby obtaining the coefficient matrix A and the brightness fitting curve.

In an exemplary embodiment, the brightness curve fitting formula may be a quintic formula, and the quintic formula may be as follows:

$$Y=A\cdot E-30*X^5-B\cdot E-25*X^4+C\cdot E-20*X^3-D\cdot E-15*X^2+F\cdot E5*X-G\cdot E8;$$

or $$Y=A\cdot E-25*X^5-B\cdot E-20*X^4+C\cdot E-15*X^3-D\cdot E-10*X^2+F\cdot E5*X-G\cdot E8,$$

where the specific values of the coefficients A, B, C, D, E, F and G need to ensure the accuracy of 25 decimal places, for example, in an exemplary embodiment, the quintic formula may be:

$$Y=3.69739288898211E-15*X^5-5.14282149625985E-10*X^4+0.000028606794472087 9*X^3-0.795339546546083*X^2+11051.0866402269*X-61387251.952073.$$

Figure 8:
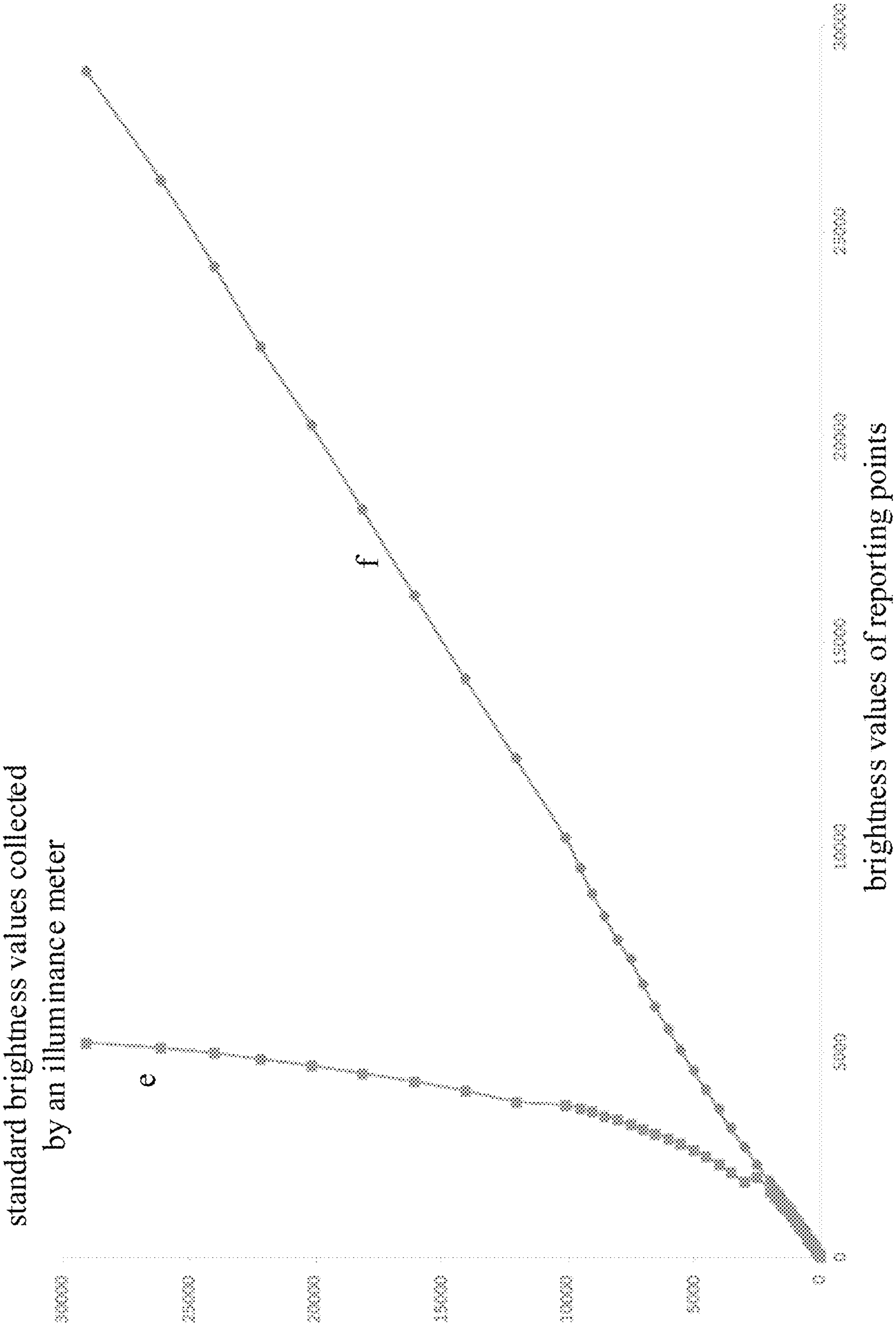
FIG. 8 is a diagram showing an accuracy comparison between the brightness algorithm in the related art and the method in another embodiment of the present disclosure.

FIG. 8 is a schematic diagram of the brightness curve corresponding to the entire standard illuminance value region obtained by using the above quintic formula to performing the fitting in an embodiment, where the abscissa is the brightness values of reporting points, and the ordinate is the standard illuminance value collected by the illuminance meter, the curve e in the figure is the curve obtained by the brightness algorithm in the related art, and the curve f is the curve obtained by the brightness detection method provided in this embodiment. It can be seen from FIG. 8 that the brightness detection method provided by the embodiment of the present disclosure can effectively improve the accuracy.

In addition, it should be noted that in the embodiments, the first version of brightness algorithm formula and sampling data will be stored in the upper-layer computer, and hardware support thereof can be as follows:

Data can be integrated in TDDI (Touch and Display Driver Integration). The location and specifications of TDDI's main storage modules can be shown in the figure. Taking TDDI in COG (chip on glass, chip is bound on the substrate) packaging as an example, the driving circuit (IC) is located on the display panel, the Flash will be on the FPC (flexible circuit board) or PCB (printed circuit board), and both RAM and Flash are used as storage modules, which store the coefficients of the brightness curve fitting formula, the first version of brightness algorithm formula and sampling data, etc. The role of the MCU (Microcontroller Unit) is mainly to calculate and read the data in the storage modules, and the MCU and RAM may be integrated inside the TDDI.

In addition, it should be noted that, as shown in FIG. 6 and FIG. 7, in the embodiments, the process of performing curve fitting on the plurality of groups of sampling data to obtain the brightness curve, and store the first version of brightness algorithm formula and other steps (that is, step S02) can be completed by the production line before the display module leaves the factory; and the regression calibration process may be completed during the brightness detection in the actual application of client.

In summary, the brightness detection method provided in the embodiments can apply a single formula to all brightness intervals, and add a regression calibration mechanism, which can avoid the problems on the zero-point drift, inter-chip difference, and low accuracy caused by semiconductor characteristics, simultaneously, and make the brightness algorithm fitting simple and convenient.

In addition, an embodiment of the present disclosure also provides a computer device, including a memory and a processor, and a computer program stored on the memory and executable on the processor, where the computer program, when executed by the processor, implements the above-mentioned method.

In addition, an embodiment of the present disclosure also provides a computer-readable medium, which stores a computer program, where the computer program, when executed by a processor, implements the above-mentioned method.

The following points need to be explained:

(1) The drawings of the embodiments of the present disclosure only relate to the structures involved in the embodiments of the present disclosure, and other structures may refer to general designs.

(2) For the sake of clarity, in the drawings used to describe the embodiments of the present disclosure, the thicknesses of layers or regions are enlarged or reduced, that is, these drawings are not drawn according to actual scale. It will be understood that when an element such as a layer, film, region, or substrate is referred to as being "on" or "under" another element, the element may be "directly" located "on" or "under" another element or intermediate element may be present.

(3) In a case of no conflict, the embodiments of the present disclosure and the features in the embodiments can be combined with each other to obtain new embodiments.

The above embodiments are only specific implementations of the present disclosure, but the protection scope of the present disclosure is not limited thereto, and the protection scope of the present disclosure should be based on the protection scope of the claims.

What is claimed is:

1. A brightness detection method, comprising:

using each of display modules in a display module production line as a test module separately, wherein the test module is provided with a photosensitive sensor;

obtaining a brightness algorithm formula of the photosensitive sensor of each of the test module; and performing, according to the brightness algorithm formula, ambient light detection by the photosensitive sensor, wherein the obtaining of the brightness algorithm formula of the photosensitive sensor of each of the test module comprises:

performing sampling for a plurality of times within a standard illuminance value region to obtain a plurality of groups of sampling data, wherein each group of sampling data comprises a standard illuminance value Y and a current parameter X fed back by the photosensitive sensor under the standard illuminance value Y;

dividing, according to a size of the standard illuminance value Y, the plurality of groups of sampling data into sampling data in a low-brightness interval, sampling data in a middle-brightness interval and sampling data in a high-brightness interval;

performing segmented curve fitting according to the sampling data in the low-brightness interval, the sampling data in the middle-brightness interval and the sampling data in the high-brightness interval, to obtain a first curve segment corresponding to the sampling data in the low-brightness interval, a second curve segment corresponding to the sampling data in the middle-brightness interval, and a third curve segment corresponding to the sampling data in the high-brightness interval;

combining the first curve segment, the second curve segment and the third curve segment to obtain a brightness fitting curve; and outputting, according to the brightness fitting curve, a first version of brightness algorithm formula.

2. The method according to claim 1, wherein the photosensitive sensor comprises a shaded sensor that is shaded and a unshaded sensor that is not shaded, and the performing sampling for the plurality of times within the standard illuminance value interval to obtain the plurality of groups of sampling data, wherein each group of sampling data comprises the standard illuminance value Y and the current parameter X fed back by the photosensitive sensor under the standard illuminance value Y, specifically comprises:

collecting a illuminance value Yj by an illuminance meter and taking it as the standard illuminance value Y during each sampling process, and collecting a unshaded current Lj of the unshaded sensor and a shaded current Ij of the shaded sensor in real time; and using a difference value between the unshaded current Lj and the shaded current Ij as a current parameter X.

3. The method according to claim 2, wherein the performing segmented curve fitting according to the sampling data in the low-brightness interval, the sampling data in the middle-brightness interval and the sampling data in the high-brightness interval, to obtain the first curve segment corresponding to the sampling data in the low-brightness interval, the second curve segment corresponding to the sampling data in the middle-brightness interval, and the third curve segment corresponding to the sampling data in the high-brightness interval specially comprises:

performing brightness curve fitting on each group of sampling data in the low-brightness interval to obtain the first curve segment;

dividing the middle-brightness interval into subintervals, and performing brightness curve fitting on multiple groups of sampling data in the subintervals to obtain the second curve segment; and dividing the high-brightness interval into subintervals, and performing brightness curve fitting on multiple groups of sampling data in the subintervals to obtain the third curve segment.

4. The method according to claim 3, wherein the dividing the middle-brightness interval into subintervals, and performing brightness curve fitting on multiple groups of sampling data in the subintervals specially comprises:

using a change value $$\frac{X_{j+1} - X_j}{Y_{J+1} - Y_J}$$

of current parameters X between adjacent groups of sampling data as an interval-division fitting standard value D; and dividing, according to the interval-division fitting standard value D, the multiple groups of sampling data into the subintervals with a set interval step value.

5. The method according to claim 4, wherein the dividing, according to the interval-division fitting standard value D, the multiple groups of sampling data into the subintervals with the set interval step value specifically comprises:

when D is less than a first threshold, the interval step value being a first step value;

when D is greater than or equal to the first threshold and less than a second threshold, the interval step value being a second step value;

when D is greater than or equal to the second threshold, the interval step value being a third step value, wherein the first threshold is less than the second threshold, the first step value is less than the second step value, and the second step value is less than the third step value.

6. The method according to claim 5, wherein the first threshold is 1, and the second threshold is 3; the first step value is 0.2, and the second step value is 0.5, and the third step value is 1.

7. The method according to claim 1, wherein in the method, a brightness curve fitting algorithm formula used when performing the brightness fitting curve according to the sampling data is a linear equation $y_a$=a+bx, wherein a and b are both undetermined parameters, $$a = \frac{\sum y}{n} - b\frac{\sum x}{n},$$

$$b = \frac{n\sum xy - \sum x\sum y}{n\sum x^2 - \left(\sum x\right)^2},$$

x is the current parameter X, and ya is the standard illuminance value.

8. The method according to claim 1, wherein after outputting the first version of brightness algorithm formula according to the brightness fitting curve, the method further comprises a step of verifying the brightness fitting curve and the first version of brightness algorithm formula, and the step specifically comprises:

obtaining a correlation coefficient R value or calculating a relative error value in a case that the brightness fitting curve is fitted;

in a case that the correlation coefficient R value is greater than 0.99 or the relative error value is less than or equal to ±20%, determining that the brightness fitting curve meets an allowable condition, otherwise determining that the brightness fitting curve and the first version of brightness algorithm formula do not meet the allowable condition; and in a case that the brightness fitting curve and the first version of brightness algorithm formula do not meet the allowable condition, removing bad points in the plurality of groups of sampling data, and/or lowering the interval step value, and performing brightness curve fitting again until the brightness fitting curve and the first version of brightness algorithm formula meet the allowable condition.

9. A computer device, comprising a memory and a processor, and a computer program stored on the memory and executable on the processor, wherein the computer program, when executed by the processor, causes the computer device to perform:

using each of display modules in a display module production line as a test module separately, wherein the test module is provided with a photosensitive sensor;

obtaining a brightness algorithm formula of the photosensitive sensor of each of the test module; and performing, according to the brightness algorithm formula, ambient light detection by the photosensitive sensor, wherein the obtaining of the brightness algorithm formula of the photosensitive sensor of each of the test module comprises:

performing sampling for a plurality of times within a standard illuminance value region to obtain a plurality of groups of sampling data, wherein each group of sampling data comprises a standard illuminance value Y and a current parameter X fed back by the photosensitive sensor under the standard illuminance value Y;

dividing, according to a size of the standard illuminance value Y, the plurality of groups of sampling data into sampling data in a low-brightness interval, sampling data in a middle-brightness interval and sampling data in a high-brightness interval;

performing segmented curve fitting according to the sampling data in the low-brightness interval, the sampling data in the middle-brightness interval and the sampling data in the high-brightness interval, to obtain a first curve segment corresponding to the sampling data in the low-brightness interval, a second curve segment corresponding to the sampling data in the middle-brightness interval, and a third curve segment corresponding to the sampling data in the high-brightness interval;

combining the first curve segment, the second curve segment and the third curve segment to obtain a brightness fitting curve; and outputting, according to the brightness fitting curve, a first version of brightness algorithm formula.

10. A non-transitory computer-readable medium storing a computer program, wherein the computer program, when executed by a processor of a computer device, causes the computer device to perform:

using each of display modules in a display module production line as a test module separately, wherein the test module is provided with a photosensitive sensor;

obtaining a brightness algorithm formula of the photosensitive sensor of each of the test module; and performing, according to the brightness algorithm formula, ambient light detection by the photosensitive sensor, wherein the obtaining of the brightness algorithm formula of the photosensitive sensor of each of the test module comprises:

performing sampling for a plurality of times within a standard illuminance value region to obtain a plurality of groups of sampling data, wherein each group of sampling data comprises a standard illuminance value Y and a current parameter X fed back by the photosensitive sensor under the standard illuminance value Y;

dividing, according to a size of the standard illuminance value Y, the plurality of groups of sampling data into sampling data in a low-brightness interval, sampling data in a middle-brightness interval and sampling data in a high-brightness interval;

performing segmented curve fitting according to the sampling data in the low-brightness interval, the sampling data in the middle-brightness interval and the sampling data in the high-brightness interval, to obtain a first curve segment corresponding to the sampling data in the low-brightness interval, a second curve segment corresponding to the sampling data in the middle-brightness interval, and a third curve segment corresponding to the sampling data in the high-brightness interval;

combining the first curve segment, the second curve segment and the third curve segment to obtain a brightness fitting curve; and outputting, according to the brightness fitting curve, a first version of brightness algorithm formula.

* * * * *